May 29, 1923.

C. PANCERO ET AL
SLAUGHTERHOUSE CONSTRUCTION
Filed Jan. 2, 1923

INVENTORS
Charles Pancero
Jacob Freund

May 29, 1923.
C. PANCERO ET AL
1,456,709
SLAUGHTERHOUSE CONSTRUCTION
Filed Jan. 2, 1923     2 Sheets-Sheet 2
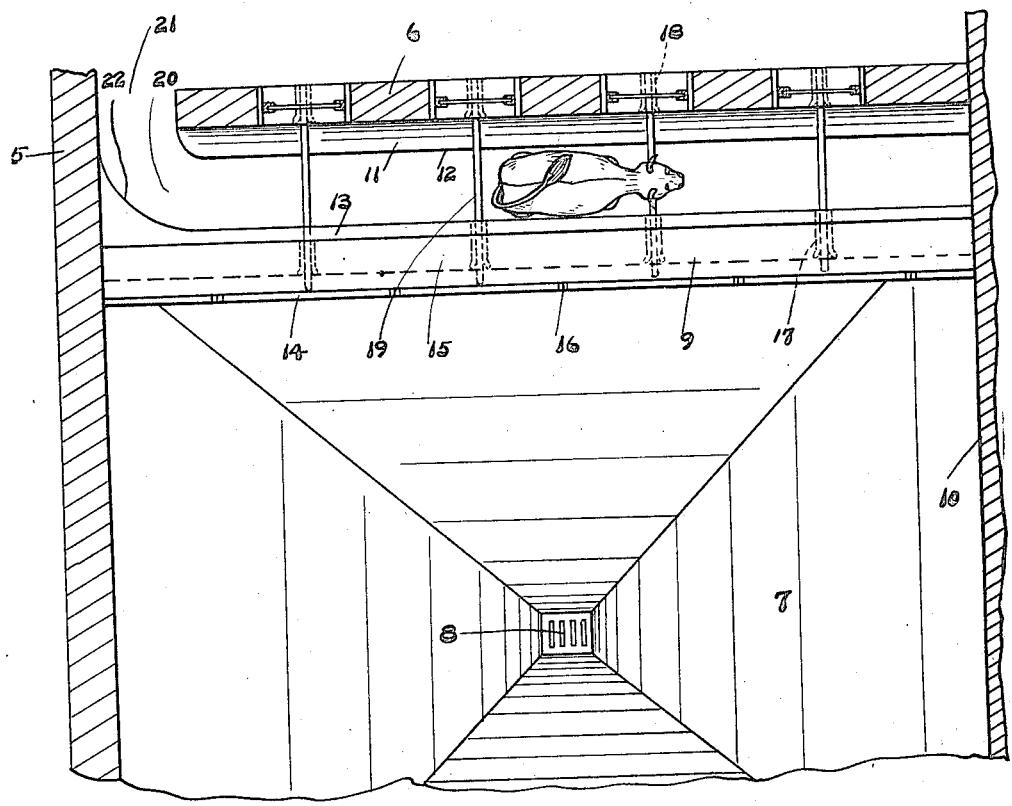
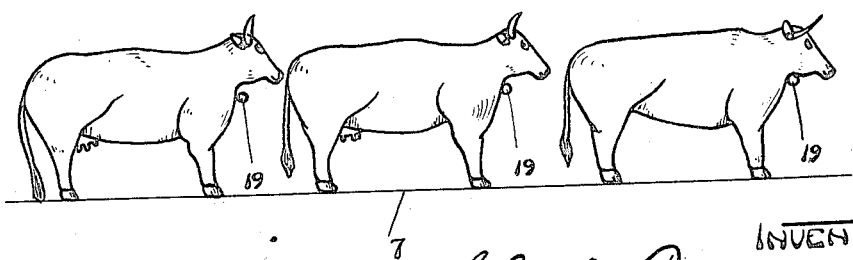
INVENTORS
Charles Pancero
Jacob Freund Patented May 29, 1923.

1,456,709

UNITED STATES PATENT OFFICE.

CHARLES PANCERO AND JACOB FREUND, OF CINCINNATI, OHIO.

SLAUGHTERHOUSE CONSTRUCTION.

Application filed January 2, 1923. Serial No. 610,267.

*To all whom it may concern:*

Be it known that we, CHARLES PANCERO and JACOB FREUND, both citizens of the United States, both residing in Cincinnati, in the county of Hamilton and State of Ohio, have invented new and useful Improvements in a Slaughterhouse Construction, of which the following is a specification.

This invention has for an object to produce a construction which is designed to bring about a greater degree of ease, efficiency, speed, and sanitation in the killing of cattle.

This and other objects are attained in the construction described in the following specification and illustrated in the accompanying drawings, in which:—

Fig. 2 is a sectional plan view illustrating our improved construction.

Fig. 4 is a somewhat diagrammatic view illustrating the operation of a detail of our invention.

Figures 1, 3:
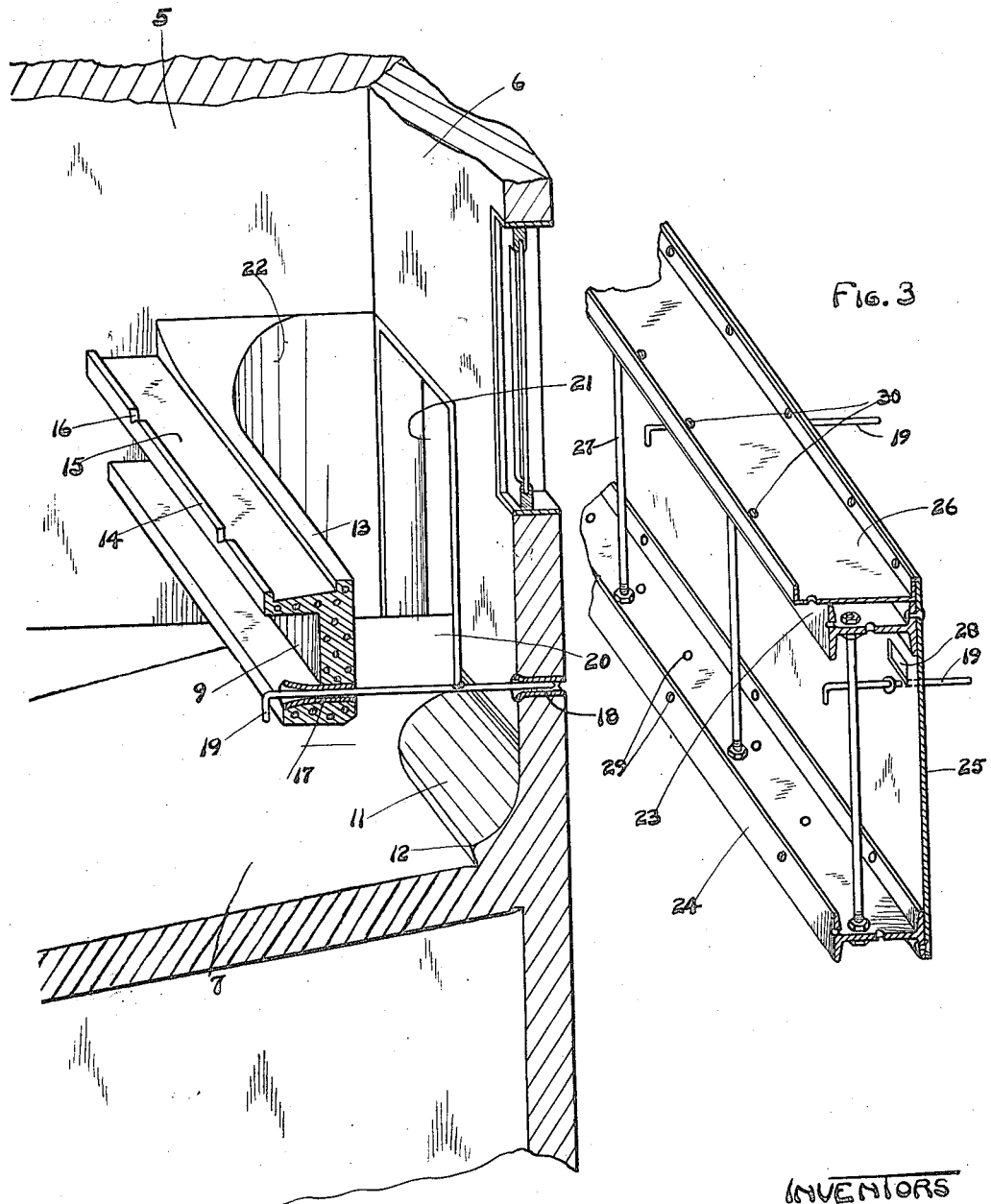
Fig. 1 is a fragmental perspective view of a portion of a slaughter house embodying our invention.
Fig. 3 is a fragmental perspective view showing a modified form of a detail of our invention.

For purposes of sanitation we preferably construct our improved slaughter house of monolithic construction.

The walls terminate in a floor 7 which, as shown in Figs. 1 and 2, is sloped considerably to drain into a cesspool 8 which may be of the construction disclosed in our copending application Serial No. 606,812. Adjacent to wall 6 a transversely extending girder 9, which, as shown in Figs. 1 and 2, may be of reenforced concrete, is supported between walls 5 and 10 at a sufficient distance above the floor 7 to permit the carcass of an animal to roll beneath it. At the bottom of wall 6 we provide a curved slide 11, which, with its undercut edge 12 is adapted to cooperate with the inclined floor in directing the carcass toward the cesspool. The top of the girder is provided with ledges 13 and 14 between which is a walk 15 upon which the workmen may walk. Notches 16 in ledge 14 permit of drainage and flushing. In wall 6 and girder 9 we place at spaced intervals, ferrules 17 and 18 through which we place removable iron rods 19 which act as cattle spacers as shown. Entrance to the runway 20 between wall 6 and girder 9 is had through a doorway 21, a curved wall 22 serving to direct the cattle into the runway.

A modified form of the girder construction is shown in Fig. 3. This form consists of a built up girder composed of I-beams 23 and 24 which are joined by a plate 25, a channel member 26 being provided on top for the walk. The I-beams are braced by spacing bolts 27 and plate 25 is provided with apertures through which the cattle spacers 19 are placed. Openings 28 may be provided for enabling the workman to see so as to insert the ends of the rods 19 in the ferrules in wall 6, and holes 29 and 30 are provided for drainage and cleansing purposes.

In the operation of our improved construction the cattle to be slaughtered are driven, one at a time into the runway. Between adjacent animals one of the spacers 19 is placed, as shown in Figs. 2 and 4, so that the animals are held in the runway in spaced relation to each other. The workmen who slaughter the animals then traverse the walk 15 and kill the animals by hitting them in the head with axes or hammers. Each animal falls and is thrown by slope 11 unto the sloping floor 7 over which it rolls or slides toward cesspool 8. If the animal falls against the girder its feet slip toward edge 12 and are thrown thereby toward the cesspool, the body hitting the curve and being thrown thereby onto the sloping floor. If the animal falls against wall 6, the feet are thrown out by edge 12 and the body falls, feet first, toward the cesspool. After reaching the cesspool the carcass is prepared by removing the hide, cleaning, etc.

Having thus described our invention what we claim is:—

1. A slaughter house construction comprising a walled enclosure, a floor within said walled enclosure inclined downwardly from the walls to the center, a girder extending between opposite walls above the floor and located adjacent to one of the remaining walls of the enclosure a distance adapted to permit the passage of cattle between the girder and the adjacent wall, a walk upon the girder, and spacer rods adapted removably to be located between the girder and the adjacent wall and at spaced intervals relatively to each other.

2. A slaughter house construction comprising a walled enclosure, a floor within said walled enclosure inclined at a downward angle away from a wall thereof, a girder extending between opposite walls located above the floor and parallel with said first mentioned wall at a distance therefrom adapted to permit the passage of cattle beteen them, a walk upon said girder, spacer rods adapted removably to be located between the girder and the adjacent wall at spaced intervals relatively to each other, and a carcass deflecting surface between the first mentioned wall and the floor, adapted to throw a slaughtered animal from between the girder and first mentioned wall onto the floor away from the wall.

In witness whereof, we affix our signatures in the presence of four witnesses:

CHARLES PANCERO.
JACOB FREUND.

Witnesses:
    FRED LENSER,
    JOHN SCHOMBERG,
    W. J. SCHULTZ,
    C. W. POTTER.